United States Patent
Soliman (10) Patent No.: US 11,577,972 B2
(45) Date of Patent: Feb. 14, 2023

(54) CONSERVING FRESH WASH WATER IN CRUDE OIL DESALTING AND CONTROL USING FORWARD OSMOSIS AND DESALTER ADVANCED CONTROL

(71) Applicant: Saudi Arabian Oil Company, Dhahran (SA)

(72) Inventor: Mohamed Ahmed Soliman, Ras Tanura (SA)

(73) Assignee: SAUDI ARABIAN OIL COMPANY

( * ) Notice: Subject to any disclaimer, the term of this patent is extended or adjusted under 35 U.S.C. 154(b) by 93 days.

(21) Appl. No.: 17/354,712

(22) Filed: Jun. 22, 2021

(65) Prior Publication Data

US 2022/0402781 A1     Dec. 22, 2022

(51) Int. Cl.
| | | |
|---|---|---|
| C02F 1/44 | (2006.01) | |
| B01D 61/00 | (2006.01) | |
| B01D 17/02 | (2006.01) | |
| C10G 31/08 | (2006.01) | |
| C02F 103/36 | (2006.01) | |

(52) U.S. Cl.
CPC .............. *C02F 1/445* (2013.01); *B01D 17/02* (2013.01); *B01D 61/002* (2013.01); *C10G 31/08* (2013.01); *C02F 2103/365* (2013.01); *C02F 2209/105* (2013.01); *C10G 2300/805* (2013.01)

(58) Field of Classification Search
CPC ........ C02F 1/44; C02F 1/445; C02F 2103/34; C02F 2103/36; C02F 2103/365; C02F 2209/105; C10G 31/08; C10G 2300/805; B01D 17/02; B01D 61/002

See application file for complete search history.

(56) References Cited

U.S. PATENT DOCUMENTS

| | | |
|---|---|---|
| 4,209,695 A | 6/1980 | Arnold et al. |
| 4,352,288 A | 10/1982 | Paap et al. |
| 4,581,134 A | 4/1986 | Richter, Jr. et al. |
| 6,159,374 A | 12/2000 | Hart |
| 7,455,109 B2 | 11/2008 | Collins |
| 8,939,211 B2 | 1/2015 | McGuire et al. |
| 9,399,908 B2 | 7/2016 | Koojiman et al. |
| 9,540,574 B2 | 1/2017 | Janssen et al. |
| 10,384,164 B2 | 8/2019 | Iyer |
| 10,441,898 B1 | 10/2019 | Bader |
| 10,703,989 B2 | 6/2020 | Koleshwar et al. |
| 2018/0370833 A1 | 12/2018 | Sutton-Sharp |
| 2022/0306495 A1* | 9/2022 | Soliman .................. C02F 1/001 |

OTHER PUBLICATIONS

James Lazenby, "Development of Porous Silicon Membranes With Hydrophobic Vapor Traps to Desalt Hydraulic Fracturing Flowback Water", Ohio State University, Apr. 4, 2019, 71 pages.

Science and Technology Program Report No. 157, Oil and Gas Produced Water Management and Beneficial Use in the Western United States, "Reclamation Managing Water in the West", U.S. Department of the Interior, Sep. 2011, 129 pages.

* cited by examiner

*Primary Examiner* — Brian A McCaig
(74) *Attorney, Agent, or Firm* — Bracewell LLP; Constance Gall Rhebergen (57) ABSTRACT

Methods and systems are provided for desalting wash water treatment and recycling processes and control of those processes. More specifically, treatment of wash water and wastewater streams using forward osmosis are provided. Additional methods and systems for desalting processes are provided, including recycling wash water. Methods for controlling operations of desalting systems and processes are provided.

23 Claims, 7 Drawing Sheets

CONSERVING FRESH WASH WATER IN CRUDE OIL DESALTING AND CONTROL USING FORWARD OSMOSIS AND DESALTER ADVANCED CONTROL

FIELD

This disclosure relates to systems and methods for crude oil desalting technology. More specifically, this disclosure relates to desalting wash water treatment and recycling processes and control of those processes.

BACKGROUND

In general, a gas oil separation plant is a continuous separation process used to refine crude oil, which includes a high pressure production trap (HPPT), a low pressure production trap (LPPT), a low pressure degassing tank (LPDT), a dehydrator unit, at least one desalting unit, a water/oil separation plant (WOSEP), a stabilizer column, centrifugal pumps, heat exchangers, and reboilers. In a GOSP, vessel pressure is often reduced in several stages to allow for the controlled separation of volatile components, such as entrained vapors and gases. Goals of a GOSP include achieving maximum liquid recovery with stabilized oil separated from gas, and water separated from gases and oil. In other words, one purpose of a GOSP is to remove water, salt, and volatile hydrocarbon gases from wet crude oil after it is obtained from a hydrocarbon-bearing reservoir.

However, a large pressure reduction in a single separator will cause flash vaporization, leading to instability and safety hazards. Thus, in conventional GOSP's, many stages and units are required. In a first stage, gas, crude oil, and free water are separated. In a second stage, crude oil is dehydrated and desalted to separate emulsified water and salt to meet certain basic sediment and water (BSW) specifications. In a third stage, crude oil is stabilized and sweetened to meet hydrogen sulfide ($H_2S$) and Reid Vapor Pressure (RVP) specifications.

Conventional GOSP systems also suffer from the following issues: inefficient energy usage; off-specification crude oil production in terms of BSW and salt content; on-specification crude oil production in terms of BSW and salt content that is substantially lower than necessary, resulting in inefficient operations and excess uses; high fresh water use rates; and high operating costs required to meet the crude specification. Additionally, conventional GOSP and desalting operations generate large quantities of water that can be difficult to recycle and treat, especially high salinity wastewater.

Various methods of controlling and operating the GOSP and desalting operations are used in conventional systems. Conventional methods of control for GOSP, including desalter operations, can be inefficient, resulting in challenges meeting specifications while keeping costs low. Therefore, better systems and methods to control GOSP operations, as well as treat and reduce wastewater generation associated with GOSP operations are desired.

SUMMARY

The disclosure relates to systems and methods for treating two water streams, one being the effluent wash water stream from a desalting unit, which is the wash water stream from the desalting unit. The disclosure also relates to methods of controlling the operation of desalting units. More specifically, the disclosure relates to treating a low salinity wastewater stream that is not compatible with crude formation water and a desalting unit effluent wash water stream in a forward osmosis unit to generate a recycle wash water stream for the desalting unit, and methods of controlling the same. The low salinity waste water stream may not be used directly as desalter wash water without treatment because of incompatibility with the crude formation water.

Therefore, disclosed is a method of simultaneously treating multiple industrial water streams. The industrial water streams include a wash water stream and a wastewater feed stream. The wash water stream includes water and dissolved solids. The method includes the step of removing the wash water stream from a desalting unit. The desalting unit can include desalter units or dehydrator units, capable of separating water from crude, such that salt and dissolved solids are removed from a crude oil. The method also includes the steps of dividing a portion of the wash water stream generating a wasted wash water stream and a forward osmosis draw stream having a draw stream osmotic pressure, and introducing the forward osmosis draw stream to a draw side of a forward osmosis unit. The forward osmosis unit includes a semipermeable membrane and is operable to selectively allow water transport through the semipermeable membrane while restricting dissolved solids from passing through the semipermeable membrane. In some embodiments, the forward osmosis unit is vibrationally assisted. The method also includes the steps of introducing the wastewater feed stream having a feed stream osmotic pressure to a feed side of the forward osmosis unit, where the feed stream osmotic pressure is lower than the draw stream osmotic pressure; and allowing water to permeate through the semipermeable membrane from the feed side into the draw side. The method also includes the steps of generating a diluted draw stream from the draw side of the forward osmosis unit, the diluted draw stream having more water than the forward osmosis draw stream; and generating a concentrated wastewater stream from the feed side of the forward osmosis unit, where the concentrated wastewater stream has less water than the wastewater feed stream.

In some embodiments, the diluted draw stream is recycled to the desalting unit, such that the diluted draw stream is mixed with an inlet crude stream to generate a desalting unit feed stream. The wastewater feed stream and the wash water stream are chemically untreated prior to contact with the semipermeable membrane, and further the wash water stream is chemically untreated prior to recycling to the desalting unit. In other embodiments, the osmotic pressure of the wastewater feed stream and the wash water stream are not altered outside of the forward osmosis unit. In yet other embodiments, no additional removal of components from the diluted draw stream is performed before the diluted draw stream is mixed with the inlet crude stream.

In some embodiments, the method also includes the steps of generating a dehydrator wash water stream containing water and dissolved solids from a dehydrator; and introducing the dehydrator wash water stream to the draw side of the forward osmosis unit. In some embodiments, the method further includes the steps of removing a dry crude stream from the desalting unit; recording a dry crude basic sediment and water (BSW) measurement from a dry crude monitor operable to measure characteristics of the dry crude stream; and recording a wash water dissolved solids measurement from a wash water monitor operable to measure characteristics of the wash water stream. The method also includes the step of calculating a PTB value for the dry crude stream using the formula below:

$$PTB = 0.35*CF*\frac{BSW}{100-BSW}*TDS*[1+0.695*TDS*10^{-6}].$$

PTB is the PTB value in pounds of salt per one thousand barrels of the dry crude stream coming from a desalter vessel or a dehydrator vessel; BSW is the dry crude basic sediment and water measurement in volume percent; TDS is the wash water dissolved solids measurement in mg/L of the wash water coming from a desalter or a dehydrator; and CF is the correction factor (tuning parameter) to account for the overall system mixing inefficiency in the mixing valves, vessels, and the existence of solid salt crystals in the crude that did not dissolve in water. The PTB of the dry crude can be calculated as a function of the measurements of TDS and BSW. In some embodiments, a typical value for CF is 1 for 100% mixing efficiency, where all salts are dissolved in water and the effluent water is the same as the water droplets suspended within the crude. The CF value will be determined during the actual operation of the desalter or dehydrator to account for the actual mixing efficiency of the water droplets with salt and crude. For example, with a CF of 1, a TDS of 28,000 mg/l, and BSW of 0.1, the PTB is 10.

In some embodiments, the method also includes the step of controlling operation of the desalting unit based upon the PTB value and a predetermined PTB value by adjusting a wastewater feed stream flow rate for the wastewater feed stream such that wash water generation is reduced in comparison to a volume of wash water generated from controlling the operation of the desalting unit without the calculation. The predetermined PTB value is 10 lb of salt per 1000 barrels of dry crude. In some embodiments, the diluted draw stream has a diluted draw stream dissolved solids content of less than 12,000 ppm.

Further disclosed is a system for simultaneously treating multiple industrial water streams. The industrial water streams include the desalting unit wash water stream and the wastewater feed stream. The system includes the desalting unit operable to remove salt from the desalting unit feed stream, where the desalting unit generates a dry crude stream containing crude oil and the wash water stream containing water and dissolved solids. The wash water stream has the draw stream osmotic pressure. The system also includes the forward osmosis unit, fluidly connected to the desalting unit. In some embodiments, the forward osmosis unit is vibrationally assisted. The forward osmosis unit contains the semipermeable membrane separating the draw side and the feed side. The forward osmosis unit is configured to accept the wastewater feed stream having the feed stream osmotic pressure to the feed side of the forward osmosis unit. The forward osmosis unit is configured to accept the desalting unit wash water stream to the draw side of the forward osmosis unit, where the feed stream osmotic pressure is lower than the draw stream osmotic pressure. The forward osmosis unit is operable to selectively allow water transport from the feed side to the draw side through the semipermeable membrane while restricting dissolved solids from passing through the semipermeable membrane, such that the forward osmosis unit generates the diluted draw stream from the draw side of the forward osmosis unit have more water than the desalting unit wash water stream. The forward osmosis unit also operates such that the forward osmosis unit generates the concentrated wastewater stream from the feed side of the forward osmosis unit having less water and a reduced volume as compared to the wastewater feed stream.

In some embodiments, the system also includes a wash water pretreatment unit operable to filter the desalting unit wash water stream before entry to the draw side of the forward osmosis unit, where the wash water pretreatment unit operates in an absence of chemical treatment. The system also includes a wastewater pretreatment unit operable to filter the wastewater feed stream before entry to the feed side of the forward osmosis unit, where the wastewater pretreatment unit operates in an absence of chemical treatment.

In some embodiments, the system also includes the dehydrator operable to separate oil from water and generate the dehydrator dry crude stream and the dehydrator wash water stream. The dehydrator is fluidly connected to the desalting unit, where the diluted draw stream is introduced to the dehydrator dry crude stream generating the desalting unit feed stream. The system further includes a heater operable to increase a mixed crude stream temperature, generating the desalting unit feed stream.

Further disclosed herein is a method for controlling the operation of the desalting unit. The method includes the steps of generating a desalting unit dry crude stream from the desalting unit, generating a desalting unit wash water stream from the desalting unit, and treating the desalting unit wash water stream in the forward osmosis unit. The forward osmosis unit is operable to selectively allow water transport through the semipermeable membrane while restricting dissolved solids transport, such that the forward osmosis unit generates the diluted draw stream. The method also includes the step of simultaneously treating the wastewater feed stream in the forward osmosis unit, such that the forward osmosis unit generates the concentrated wastewater stream. The method also includes the steps of measuring the dry crude basic sediment and water measurement from the desalting unit dry crude monitor operable to measure characteristics of the desalting unit dry crude stream; measuring the desalting unit wash water dissolved solids measurement from the wash water monitor operable to measure characteristics of the desalting unit wash water stream; and sending the dry crude basic sediment and water measurement and the desalting unit wash water dissolved solids measurement to a controller. The controlled contains a processor operable to process monitor data. The controller is operable to control one or more system operations control. The method also includes the step of calculating the PTB value for the desalting unit dry crude stream through the processor using the formula:

$$PTB = 0.35*CF*\frac{BSW}{100-BSW}*TDS*[1+0.695*TDS*10^{-6}].$$

PTB is the PTB value in pounds of salt per one thousand barrels of the desalting unit dry crude stream in volume percent coming from a desalter or a dehydrator; BSW is the dry crude basic sediment and water measurement of the desalting unit dry crude stream in volume percent; TDS is the wash water dissolved solids measurement in mg/L of the desalting unit wash water stream coming from a desalter or a dehydrator; and CF is the correction factor (tuning parameter) to account for the overall system mixing inefficiency in the mixing valves, vessels, and the existence of solid salt crystals in the crude that did not dissolve in water. The PTB of the dry crude can be calculated as a function of the measurements of TDS and BSW. In some embodiments, a typical value for CF is 1 for 100% mixing efficiency, where all salts are dissolved in water and the effluent water is the same as the water droplets suspended within the crude. The CF value will be determined during the actual operation of the desalter or dehydrator to account for the actual mixing efficiency of the water droplets with salt and crude.

The method also includes the steps of comparing the PTB value to the predetermined PTB value programmed within the controller, and adjusting one or more system operations control through the controller such that the PTB value nears without meeting the predetermined PTB value.

In some embodiments, the method also includes the steps of sending one or more operations monitor measurement to the controller and adjusting one or more system operations control through the controller based upon the one or more operations monitor measurement. The one or more system operations control includes a wastewater feed stream control valve operable to vary a wastewater feed stream flow rate of the wastewater feed stream.

In some embodiments, the method includes the step of recycling the diluted draw stream to the desalting unit, where the one or more systems operations control includes a diluted draw stream control valve operable to vary a diluted draw stream flow rate. The one or more operations monitor measurement is selected from the group including: a diluted draw stream flow rate; an inlet crude dissolved solids measurement; a desalting unit feed stream temperature; a desalting unit level measurement; a desalting unit wash water flow rate; a wastewater feed stream dissolved solids measurement; a concentrated wastewater stream dissolved solids measurement; and combinations of the same. The one or more systems operations control is selected from the group including: the heater; a desalting unit control valve; a desalting unit wash water pump; a wasted wash water control valve; a desalting unit current; a demulsifier injection rate; and combinations of the same.

In some embodiments, the method also includes the steps of an artificial intelligence algorithm predicting when the PTB value for the desalting unit dry crude stream will exceed the predetermined PTB value based upon the one or more operations monitor measurements, and the artificial intelligence algorithm provides changes to the one or more system operations control. The artificial intelligence is also used to update and maintain the predictive model parameters.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

In the accompanying Figures, similar components or features, or both, can have a similar reference label. For the purpose of the simplified schematic illustrations and descriptions of FIGS. 1 through 7, the numerous pumps, valves, temperature and pressure sensors, electronic controllers, and the like that can be employed and well known to those of ordinary skill in the art are not included. Further, accompanying components that are in conventional industrial operations are not depicted. However, operational components, such as those described in the present disclosure, can be added to the embodiments described in this disclosure.

DETAILED DESCRIPTION

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

Advantages of the present disclosure include simultaneous treatment of two different industrial wastewater streams, even difficult to treat streams such as concentrated brine. The simultaneous treatment through a forward osmosis system results in the ability to recycle desalter wash water from one or more desalting vessels, generating a recycled wash water stream with lowered total dissolved solids (TDS) for the desalter, as well as a concentrated wastewater stream for further treatment or disposal. Advantageously, the present disclosure reduces fresh water consumption throughout the desalting process through treatment, recycling, and control processes. Additionally, PTB results on crude oil streams can be calculated faster, with less expensive monitoring equipment. Reductions and gained efficiencies in power usage, demulsifier injections, and other unit operations utilities advantageously results in better control and cost and man-hour savings.

Figure 1:
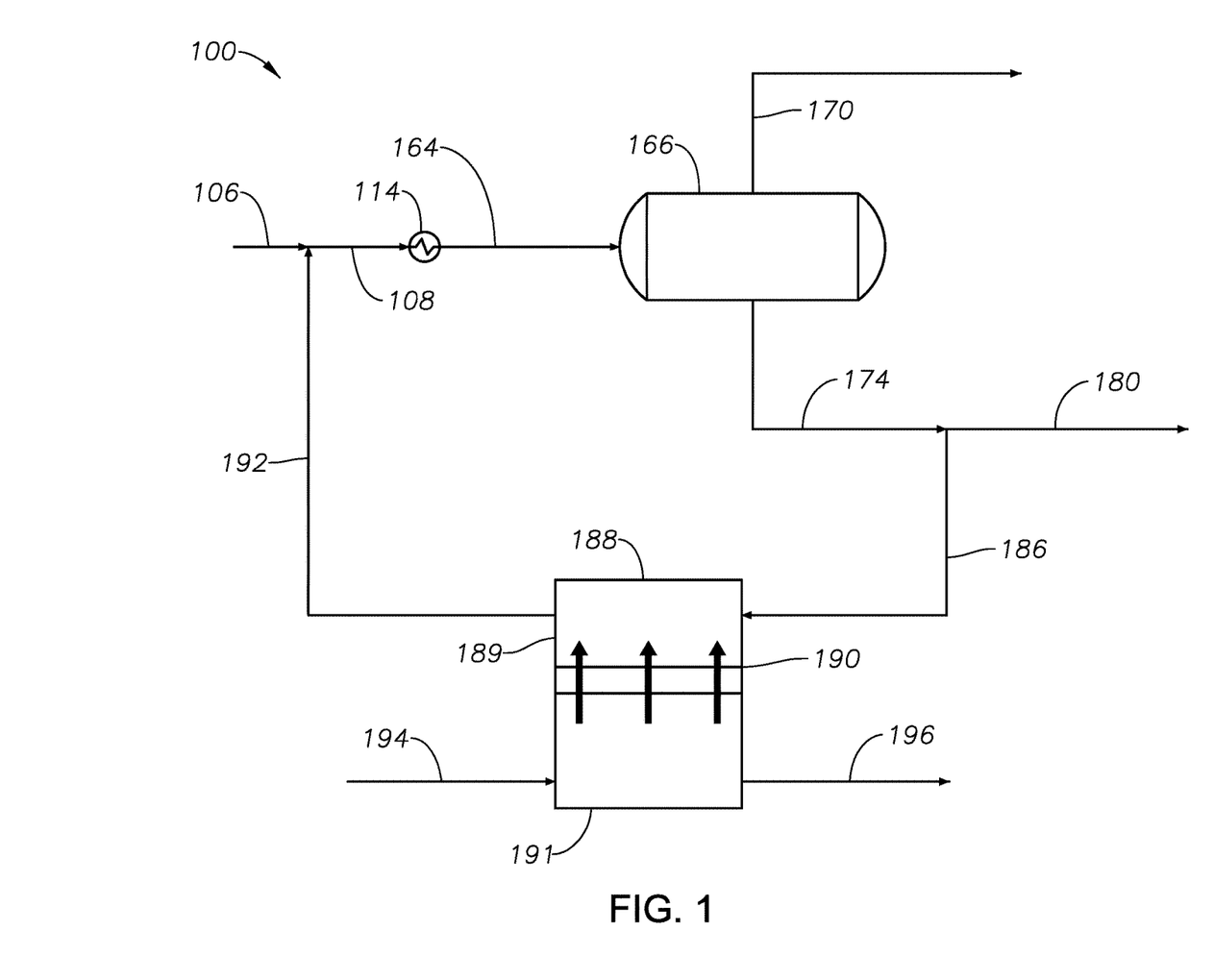
FIG. 1 is a process diagram of a desalter wash water treatment system, according to an embodiment.

Referring to FIG. 1, desalter wash water treatment system 100 is depicted. Inlet crude stream 106 is treated in desalter unit 166. Inlet crude stream 106 contains crude oil contaminated with water, salt, and dissolved solids. In some embodiments, inlet crude stream 106 has undergone inlet separation processes, such as those found in GOSPs. Inlet crude stream 106 is combined with diluted draw stream 192, generating mixed crude stream 108. Diluted draw stream 192 contains water which, when contacted with suspended water, salt, and dissolved solids in inlet crude stream 106, will remove salt or dissolved solids from inlet crude stream 106. A mixing valve (not shown) can be used to thoroughly blend mixed crude stream 108. Mixed crude stream 108 is introduced to heater 114, generating desalter feed stream 164. Heater 114 can be any type of heat exchanger, direct heater, indirect heater, or other device capable of raising the temperature of mixed crude stream 108. Heater 114 can increase the temperature of mixed crude stream 108 to between 125° F. and 175° F.

Desalter feed stream 164 is introduced to desalter unit 166. Desalter unit 166 is a desalting unit. Desalter unit 166 can be any type of unit capable of separating wash water from crude oil for the purpose of removing or reducing salt content in crude oil to meet product specifications. Desalter unit 166 can incorporate equipment designed to increase the efficiency of the water/oil separation or salt removal, such as electrolysis or electrostatic coalescing systems. Desalter unit 166 generates desalter unit dry crude stream 170, containing crude oil meeting certain standards for quality. In some embodiments, desalter unit dry crude stream 170 has less than 10 lbs salt/1000 barrels and has less than about 0.2 vol % water. Desalter unit dry crude stream 170 can be further treated.

Desalter unit 166 also generates desalter unit wash water stream 174, which contains water and dissolved solids, including salt, and is the effluent wash water stream from desalter unit 166. Desalter unit wash water stream 174 has a high TDS level, and a high osmotic pressure. In some embodiments, desalter unit wash water stream 174 has a TDS level of greater than 12,000 ppm. In some embodiments, desalter unit wash water stream 174 has a TDS level in the range of 12,000 ppm to 45,000 ppm. In some embodiments, desalter unit wash water stream 174 has an osmotic pressure in the range of about 135 psig to about 515 psig. A portion of desalter unit wash water stream 174 can be divided, generating wasted wash water stream 180 and forward osmosis draw stream 186. Wasted wash water stream 180 can be disposed or treated in another system. Forward osmosis draw stream 186 is fed into draw side 189 of forward osmosis unit 188. Semipermeable membrane 190 of forward osmosis unit 188 separates draw side 189 from feed side 191. Forward osmosis unit 188 can be any type of unit or process capable of selectively allowing water transport through semipermeable membrane 190 from one liquid to another liquid based upon osmotic pressure differences. In some embodiments, forward osmosis unit 188 is vibrationally assisted, which reduces fouling in forward osmosis and enhances mixing. Forward osmosis unit 188 restricts dissolved solids from passing through semipermeable membrane 190. Semipermeable membrane 190 can be any type of membrane containing small pores which allow water molecules to pass through freely while solute molecules are hindered from passing through. Semipermeable membrane 190 can include a flat membrane, a spiral wound membrane, a tubular membrane, other known membrane structures, and combinations of the same. The tubular membrane can have a cross section selected from circular, square, rectangular, and triangular cross sections. The tubular membrane can include hollow membranes. In at least one embodiment, semipermeable membrane 190 is a spiral wound membrane. In at least one embodiment, semipermeable membrane 190 is a tubular membrane containing hollow fibers. Semipermeable membrane 190 can be constructed from organic materials or mineral or ceramic materials. Organic materials can include cellulose acetate, cellulose nitrate, polysulfone, polyvinylidene fluoride, polyamide and acrylonitrile copolymers. Mineral or ceramic materials can include C—Al—O, ZrO, TiO2 or a mixed oxide of SiO, and Al—O or ZrO2. Semipermeable membrane 190 can be composites of organic materials and mineral or ceramic materials. Semipermeable membrane 190 can be designed for the specific application, in light of the solids and other contaminants in the water. In vibrationally assisted forward osmosis units, the vibration assisted semipermeable membranes reduce fouling and enhance mixing. Shear stress is generated on the membrane surface when the semipermeable membranes are vibrating. The shear stress can induce boundary layer disturbances for mitigating concentration polarization effects and controlling fouling. Vibrationally assisted forward osmosis units can use various systems such as rotating disks, vibrating flat sheet membranes, and vibrating hollow fibers. In some embodiments, a Vibratory Shear Enhanced Process (VSEP) system is used.

Wastewater feed stream 194 is introduced to feed side 191 of forward osmosis unit 188. Wastewater feed stream 194 has a feed stream osmotic pressure, which is lower than the osmotic pressure of desalter unit wash water stream 174 but cannot be used directly as wash water for the desalting vessels without extensive treatment because of incompatibility with the formation water in the crude stream and other contamination that may affect crude quality. Wastewater feed stream 194 can be generated from other industrial processes, including boiler water, treated sewage effluent, or condensed water from processing. Water from wastewater feed stream 194 passes through semipermeable membrane 190 in direction of arrows from feed side 191 into draw side 189. Suspended and dissolved solids, as well as other components, are selectively restricted from passing through semipermeable membrane 190. Concentrated wastewater stream 196 is generated from feed side 191 and has a higher dissolved and suspended solids content, and a lower volumetric flow rate and a lower water content, than wastewater feed stream 194. Diluted draw stream 192 is generated from draw side 189 and contains more water, has a lower dissolved and suspended solids content, and has a higher volumetric flow rate, than forward osmosis draw stream 186. Diluted draw stream 192 has a TDS level less than 12,000 ppm. In some embodiments, diluted draw stream 192 has a TDS level in the range of 2,000 ppm to 12,000 ppm. In some embodiments, diluted draw stream 192 and wastewater feed stream 194 are chemically untreated before introduction to forward osmosis unit 188. In some embodiments, no adjustments to osmotic pressure are made to diluted draw stream 192 and wastewater feed stream 194 are chemically untreated before introduction to forward osmosis unit 188. In some embodiments, no further components are removed from diluted draw stream 192 before recycling to the system.

Figure 2:
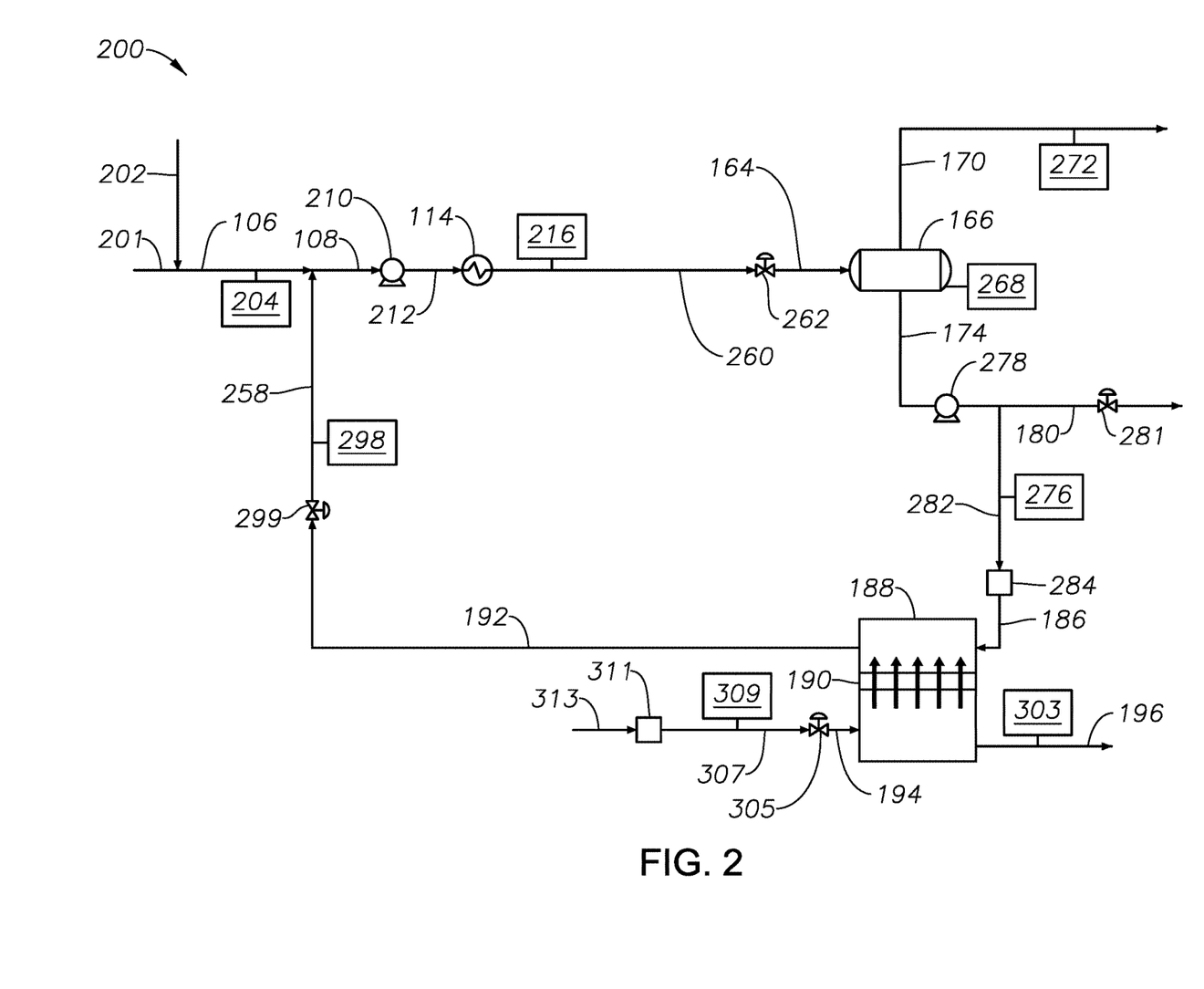
FIG. 2 is a process diagram of a desalter wash water treatment control system, according to an embodiment.

Referring to FIG. 2, desalter wash water control system 200 is depicted, and shares many of the same elements and characteristics of desalter wash water treatment system 100. Raw inlet crude stream 201 contains crude oil. Demulsifier 202 is added to inlet crude stream 201, generating inlet crude stream 106. Mixing and control valves (not shown) can be used to control crude flow including amount of demulsifier addition. Inlet crude monitor 204 measures a variety of characteristics of inlet crude stream 106, including temperature, water cut, and TDS. Recycled treated wash water stream 258 is mixed with inlet crude stream 106, generating mixed crude stream 108. Mixed crude stream 108 enters pump 210, which can provide additional lift, mixing, or both. Heater feed stream 212 is removed from pump 210, entering heater 114. Heater 114 can be controlled in response to temperature monitored in temperature monitor 216. Desalter mixed crude stream 260 is removed from heater 114, and is monitored by temperature monitor 216, which measures temperature. Desalter mixed crude stream 260 is introduced to desalter control valve 262, generating desalter feed stream 164. Desalter control valve 262 can vary the rate of desalter feed stream 164 entering desalter unit 166. Desalter unit level control 268 monitors oil and water levels in desalter unit 166, and desalter control valve 262 can be controlled in response to desalter unit level control 268. Desalter unit dry crude monitor 272 measures characteristics of desalter unit dry crude stream 170, including BSW.

Desalter unit wash water stream 174 is introduced to desalter unit wash water pump 278, increasing the pressure of the stream. Wasted wash water stream 180 is removed, controlled by wasted wash water control valve 281. Wash water pretreatment stream 282 is generated from the removal of wasted wash water stream 180, and is measured by desalter unit wash water monitor 276, which measures a variety of characteristics including flow rate and TDS. Wash water pretreatment stream 282 is introduced to wash water pretreatment 284. Wash water pretreatment 284 can include physical treatment processes, including filtration, that can prevent fouling of membranes within forward osmosis unit 188. In some embodiments, wash water pretreatment 284 includes injection of an oxygen scavenger and chemical biocide (such as chlorine), oil removal, and conventional suspended solids or debris filtration. In some embodiments, wash water pretreatment 284 occurs in the absence of chemical treatment or chemical processes. In some embodiments, wash water pretreatment 284 does not alter or affect the osmotic pressure of the wash water pretreatment stream 282. Forward osmosis draw stream 186 is generated from wash water pretreatment 284, and is introduced to forward osmosis unit 188.

Wastewater supply stream 313 is introduced to wastewater pretreatment 311. Wastewater pretreatment 311 can include physical treatment processes, including filtration, that can prevent fouling of membranes within forward osmosis unit 188. In some embodiments, wastewater pretreatment 311 includes injection of an oxygen scavenger and chemical biocide (such as chlorine), oil removal, and conventional suspended solids or debris filtration. In some embodiments, wastewater pretreatment 311 occurs in the absence of chemical treatment or chemical processes. In some embodiments, wastewater pretreatment 311 does not alter or affect the osmotic pressure of the wastewater pretreatment 311. Pretreated wastewater stream 307 is generated from wastewater pretreatment 311. Pretreated wastewater monitor 309 measures a variety of characteristics including flow rate, temperature, and TDS. Pretreated wastewater stream 307 is introduced to wastewater feed stream control valve 305. Wastewater feed stream control valve 305 can be controlled in response to concentrated wastewater monitor 303, desalter unit wash water monitor 276, desalter unit dry crude monitor 272, inlet crude monitor 204, and diluted draw stream monitor 298. Wastewater feed stream 194 is generated from wastewater feed stream control valve 305. Concentrated wastewater monitor 303 measures a variety of characteristics of concentrated wastewater stream 196, including flow rate and TDS.

Diluted draw stream 192 is introduced into diluted draw stream control valve 299, which can control the flow rate of recycled treated wash water stream 258. Diluted draw stream control valve 299 can be controlled in response to desalter unit dry crude monitor 272, desalter unit wash water monitor 276, and desalter unit level control 268. Diluted draw stream monitor 298 measures a variety of characteristics of recycled treated wash water stream 258, including flow rate and TDS.

Desalter wash water control system 200 can be controlled by calculating the PTB value for the desalter unit dry crude stream 170 and comparing the PTB value to the predetermined value, which can be a standard crude requirement such as 10 lb salt/1000 barrels. The predetermined value can be a minimum value, such as an operational floor, or a maximum value, such as an operational ceiling. Adjustments in operation can be made so that over time the PTB value nears without meeting the predetermined PTB values. In some embodiments, the predetermined value can be a minimum value such as 7 lb salt/1000 barrels, or alternately 7.5 lb salt/1000 barrels. In some embodiments the PTB value can be a maximum value such as 9 lb salt/1000 barrels, or alternately 9.5 lb salt/1000 barrels. The PTB value for the dry crude stream can be calculated, measured, or determined through other means known in the art. In some embodiments, the PTB value for the dry crude stream is calculated using Eq. 1, below:

$$PTB = 0.35 * CF * \frac{BSW}{100 - BSW} * TDS * \left[1 + 0.695 * TDS * 10^{-6}\right] \quad \text{Eq. 1}$$

where PTB is the PTB value in pounds of salt per one thousand barrels of the dry crude coming out from the desalter vessel or dehydrator vessel; BSW is the dry crude basic sediment and water measurement in volume percent; TDS is the total dissolved solids measurement in mg/L of the effluent water coming from the desalters or dehydrators; and CF is the correction factor (tuning parameter) to account for the overall system mixing inefficiency in the mixing valves, vessels, and the existence of solid salt crystals in the crude that did not dissolve in water. The PTB of the dry crude can be calculated as a function of the measurements of TDS and BSW. A typical value for CF is 1 for 100% mixing efficiency, where all salts are dissolved in water and the effluent water is the same as the water droplets suspended within the crude. The CF value can be determined during the actual operation of the desalter or dehydrator to account for the actual mixing efficiency of the water droplets with salt and crude. For example, with a CF of 1, a TDS of 28,000 mg/l, and BSW of 0.1, the PTB is 10.

The BSW measurement can be recorded or measured from desalter unit dry crude monitor 272. The TDS measurement (the wash water dissolved solids measurement) can be recorded or taken from desalter unit wash water monitor 276. When the PTB value as calculated is greater than the predetermined value, the flow rate of wastewater feed stream 194 can be increased through adjusting wastewater feed stream control valve 305. Increasing the flow rate of wastewater feed stream 194 increases the water transport through forward osmosis unit 188, resulting in lowered TDS levels in diluted draw stream 192 and increased available flow rate of recycled treated wash water stream 258. The lowered TDS levels and the increased flow rate can increase salt and dissolved solids removal from the crude oil in desalter unit 166.

Figure 3:
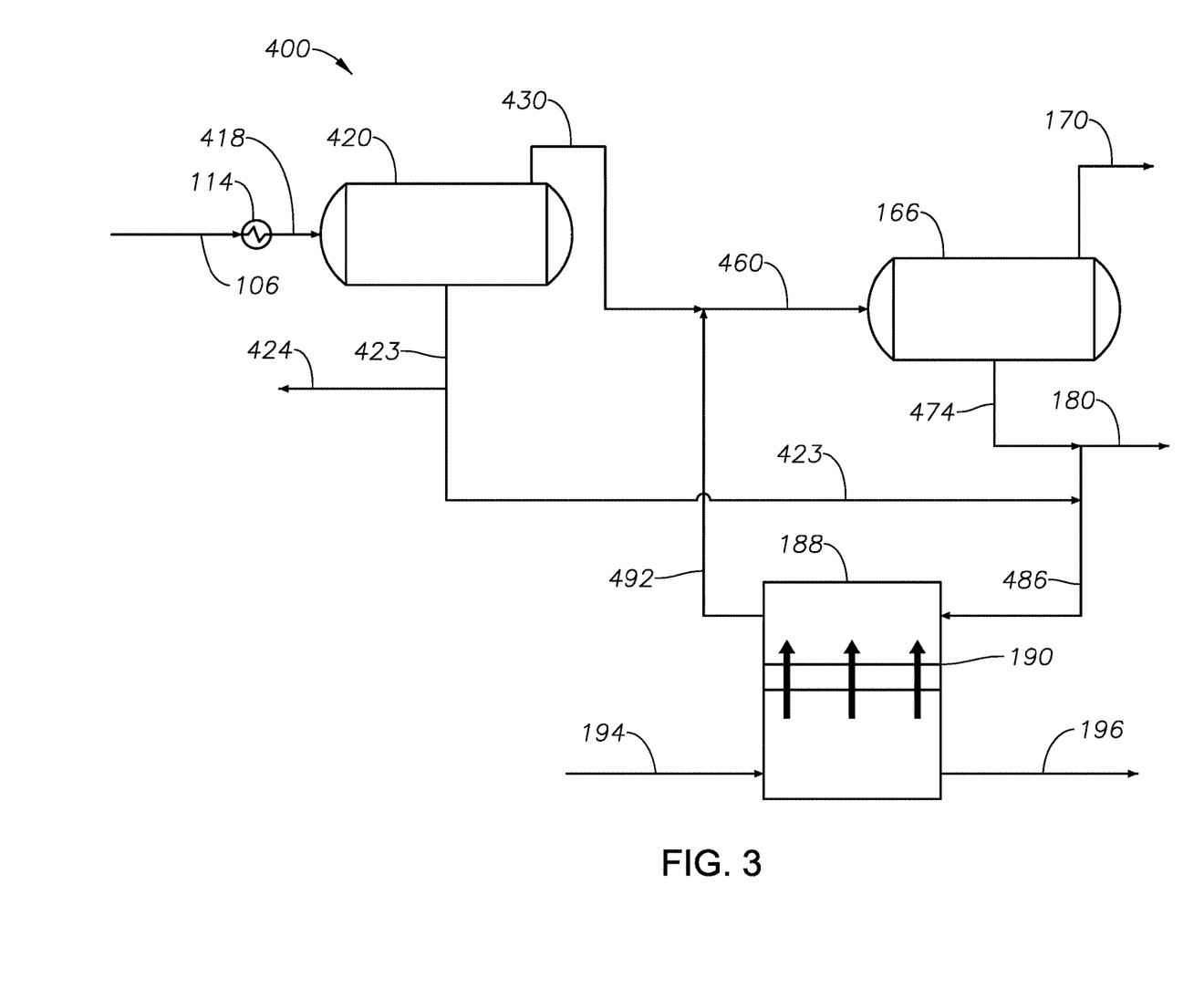
FIG. 3 is a process diagram of a dehydrator and desalter wash water treatment system, according to an embodiment.

Referring to FIG. 3, dehydrator and desalter wash water treatment system 400 is depicted, and shares many of the same elements and characteristics of desalter wash water treatment system 100. Inlet crude stream 106 is introduced to heater 114, generating dehydrator feed stream 418. Dehydrator feed stream 418 is introduced to dehydrator 420. Dehydrator 420 is a desalting unit. Dehydrator 420 can be any type of unit capable of separating water from crude oil for the purpose of removing or reducing water or salt content in crude oil. Dehydrator 420 can include an electrostatic coalescer. Dehydrators can produce crude oil with greater than about 0.2 vol % water. Dehydrator 420 generates dehydrator wash water stream 423, which contains water, salt, and dissolved solids. A portion of dehydrator wash water stream 423 can be removed, generating dehydrator wash water disposal stream 424, which can be disposed, recycled, or further treated.

Dehydrator dry crude stream 430 is removed from dehydrator 420. Dehydrator dry crude stream 430 can contain greater than about 10 lbs of salt per 1000 barrels of crude. Diluted draw stream 492 is combined with dehydrator dry crude stream 430, generating desalter mixed crude stream 460. A mixing valve (not shown) can be used to thoroughly blend desalter mixed crude stream 460. Desalter mixed crude stream 460 is introduced to desalter unit 166. Desalter unit 166 generates desalter unit wash water stream 474, which contains water, salt, and dissolved solids. A portion of desalter unit wash water stream 474 is removed, generating wasted wash water stream 180. Dehydrator wash water stream 423 is introduced to desalter unit wash water stream 474, generating forward osmosis draw stream 486. Forward osmosis draw stream 486 is introduced to forward osmosis unit 188. Diluted draw stream 492 is removed from forward osmosis unit 188, and contains more water and a lower level of TDS than forward osmosis draw stream 486.

Figure 4:
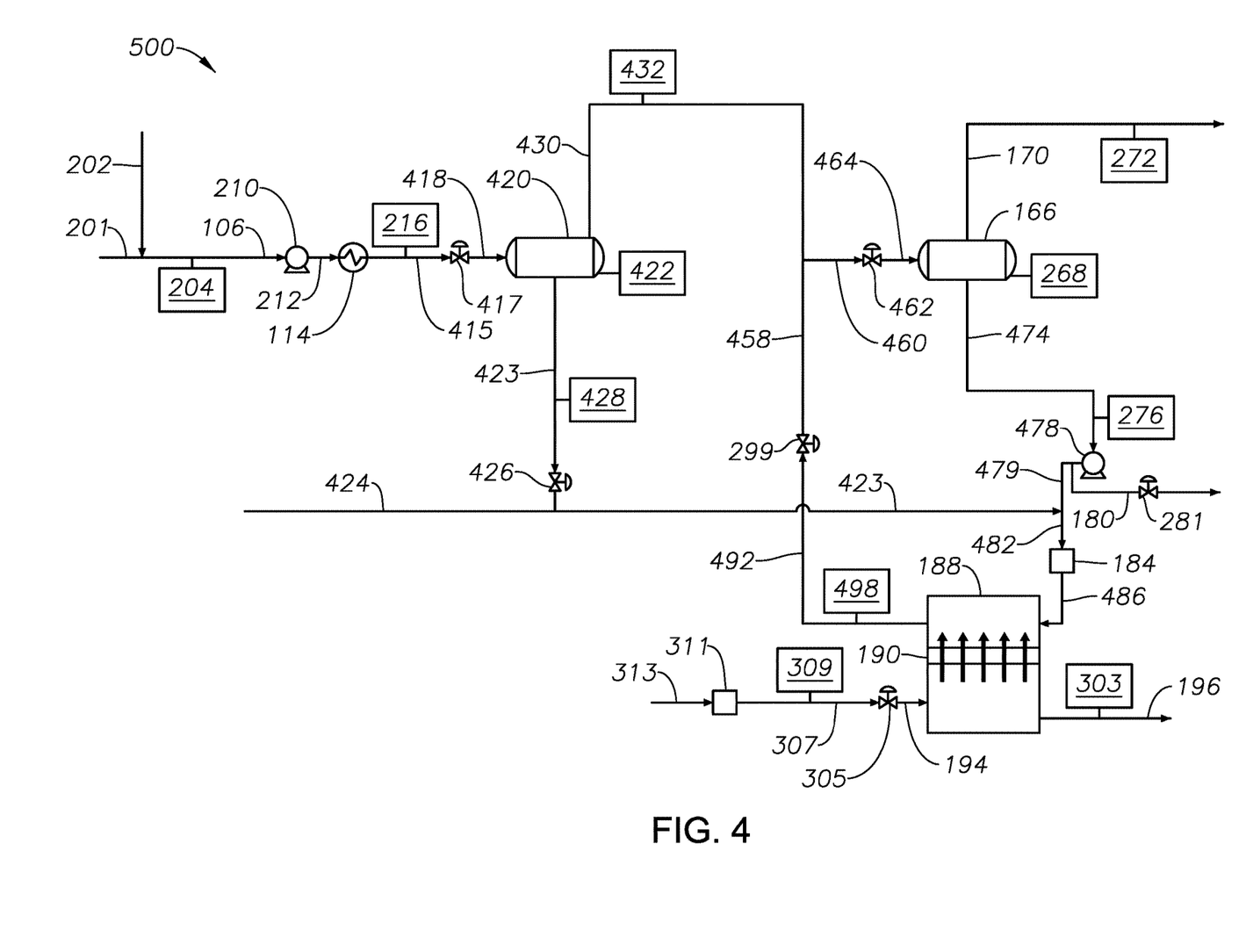
FIG. 4 is a process diagram of a dehydrator and desalter wash water treatment control system, according to an embodiment.

Referring to FIG. 4, dehydrator and desalter wash water treatment control system 500 is depicted, and shares many of the same elements and characteristics of desalter wash water treatment control system 200 and dehydrator and desalter wash water treatment system 400. Heated feed stream 415 is removed from heater 114, and is introduced to dehydrator control valve 417, which can control the amount of flow being introduced to dehydrator 420. Dehydrator feed stream 418 is generated from dehydrator control valve 417, and is introduced to dehydrator 420. Dehydrator level control 422 monitors oil and water levels in dehydrator 420, and dehydrator control valve 417 can be controlled in response to dehydrator level control 422.

Dehydrator 420 generates dehydrator wash water stream 423, containing water, salt, and dissolved solids. Dehydrator wash water monitor 428 measures a variety of characteristics of dehydrator wash water stream 423, including flow rate and TDS. Dehydrator wash water control valve 426 can control the flow rate of dehydrator wash water stream 423, and can be controlled in response to dehydrator level control 422 and diluted draw stream monitor 498.

Dehydrator 420 generates dehydrator dry crude stream 430. Dehydrator dry crude monitor 432 measures a variety of characteristics of dehydrator dry crude stream 430, including BSW. Dehydrator dry crude stream 430 is combined with recycled treated wash water stream 458, generating desalter mixed crude stream 460. A mixing valve (not shown) can be used to thoroughly blend desalter mixed crude stream 460. Desalter mixed crude stream 460 is introduced to desalter control valve 462, which can control the amount of feed to the desalter, generating desalter feed stream 464. Desalter feed stream 464 is introduced to desalter 166. Desalter 166 generates desalter unit wash water stream 474. Desalter unit wash water stream 474 is introduced to desalter unit wash water pump 478, generating pumped desalter wash water stream 479. Pumped desalter wash water stream 479 is combined with dehydrator wash water stream 423, generating wash water pretreatment feed stream 482. Wash water pretreatment feed stream 482 is introduced to wash water pretreatment 184, generating forward osmosis draw stream 486, which is introduced to forward osmosis unit 188.

Diluted draw stream 492 is introduced into diluted draw stream control valve 299, which can control the flow rate of recycled treated wash water stream 458. Diluted draw stream control valve 299 can be controlled in response to desalter unit dry crude monitor 272, desalter unit wash water monitor 276, and desalter unit level control 268. Diluted draw stream monitor 498 measures a variety of characteristics of diluted draw stream 492, including flow rate and TDS.

Dehydrator and desalter wash water treatment control system 500 can be controlled by calculating the PTB value for the desalter unit dry crude stream 170 and comparing the PTB value to the predetermined value, using Eq. 1. The BSW measurement can be recorded or taken from desalter unit dry crude monitor 272. The TDS measurement can be recorded or taken from desalter unit wash water monitor 276. The PTB value can also be calculated for dehydrator dry crude stream 430 using the BSW measure from dehydrator dry crude monitor 432 and the TDS measurement from dehydrator wash water monitor 428. Additional adjustment to operations can be made using these measurements, including increasing the flow rate of diluted draw stream 492 and increasing the flow rate of recycled treated wash water stream 458.

Figure 5:
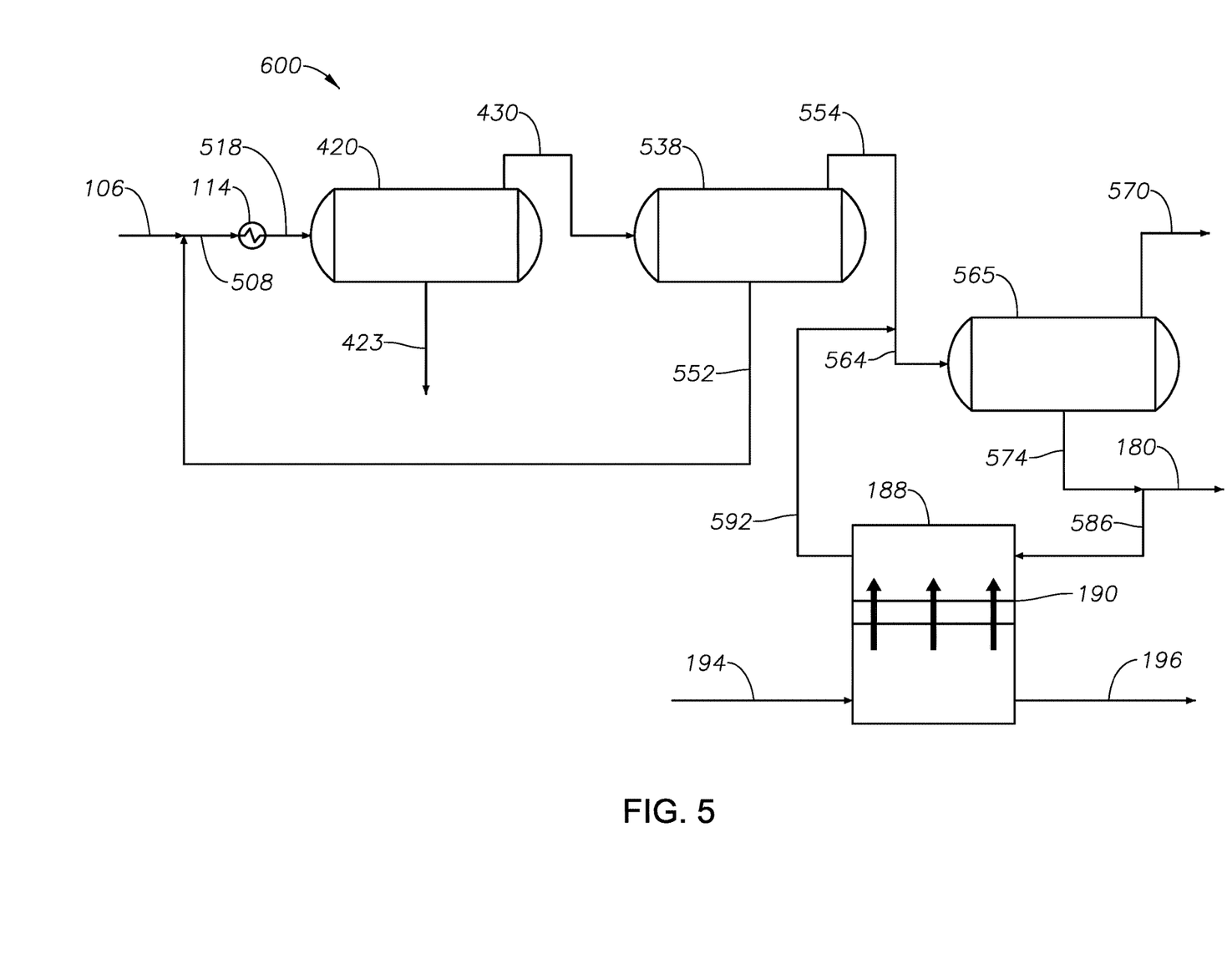
FIG. 5 is a process diagram of a multi-level desalter wash water treatment system, according to an embodiment.

Referring to FIG. 5, multi-level desalter wash water treatment system 600 is depicted, and shares many of the same elements and characteristics of dehydrator and desalter wash water treatment system 400. Inlet crude stream 106 is combined with first desalter unit wash water recycle stream 552, generating mixed crude stream 508. A mixing valve (not shown) can be used to thoroughly blend mixed crude stream 508. Mixed crude stream 508 is introduced to heater 114, generating dehydrator feed stream 518. Dehydrator feed stream 518 is introduced to dehydrator 420. Dehydrator dry crude stream 430 is introduced to first desalter unit 538. First desalter unit 538 can be similar or the same as desalter unit 166. First desalter unit 538 generates first desalter unit wash water recycle stream 552 containing water, salt, and dissolved solids.

First desalter unit 538 also generates first desalter unit dry crude stream 554. Diluted draw stream 592 is combined with first desalter unit dry crude stream 554, generating second desalter feed stream 564. Mixing valve (not shown) can be used to thoroughly blend second desalter feed stream 564. Second desalter feed stream 564 is introduced to second desalter unit 565. Second desalter unit 565 can be similar or the same as desalter unit 166. Second desalter unit 565 generates second desalter unit dry crude stream 570.

Second desalter unit 565 generates second desalter unit wash water stream 574, containing water, salt, and dissolved solids. A portion of desalter unit wash water stream 574 can be divided, generating wasted wash water stream 180 and forward osmosis draw stream 586. After treatment, diluted draw stream 592 is generated from forward osmosis unit 188, and recycled to second desalter unit 565.

Figure 6:
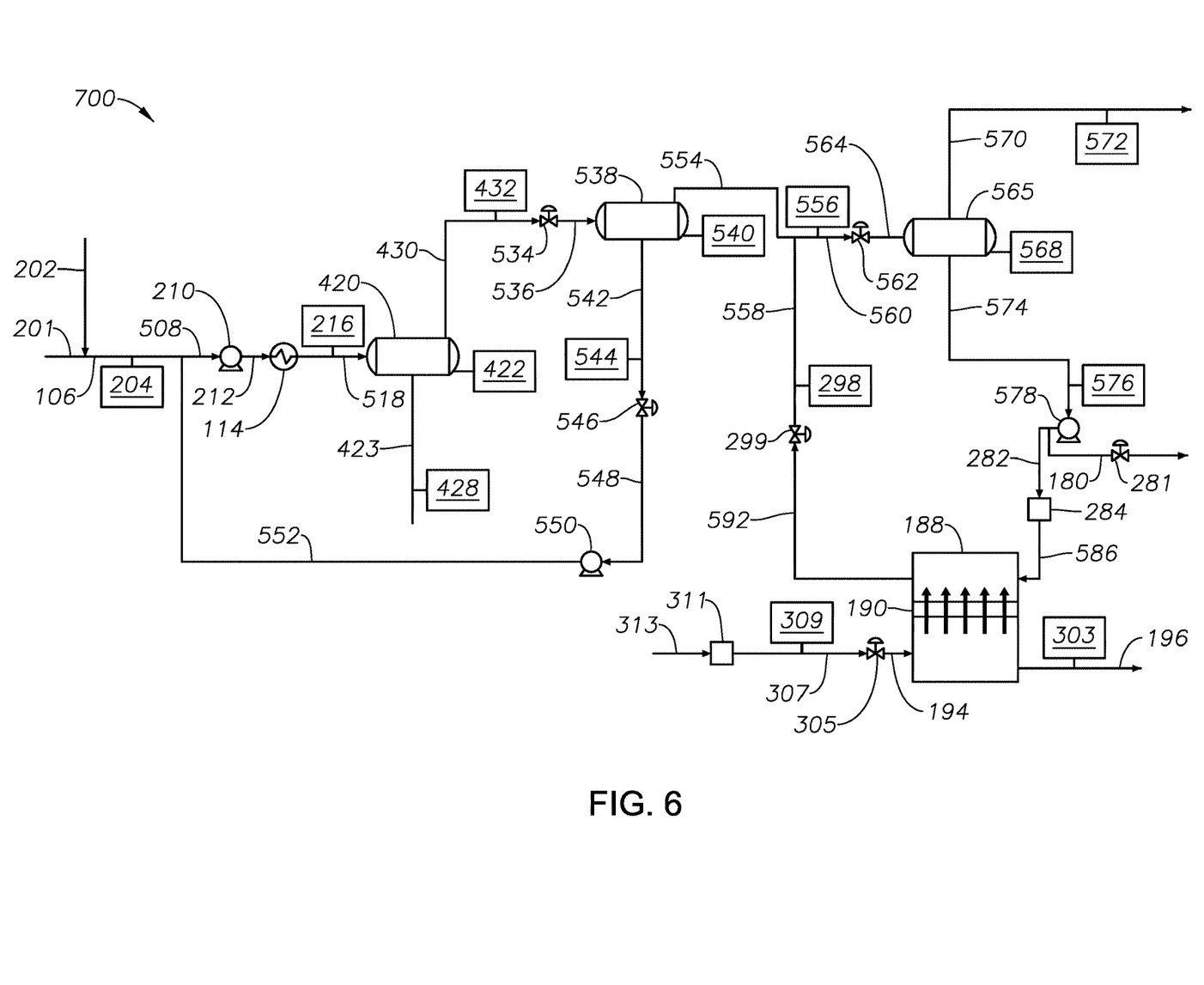
FIG. 6 is a process diagram of a multi-level desalter wash water treatment control system, according to an embodiment.

Referring to FIG. 6, multi-level desalter wash water treatment control system 700 is depicted, and shares many of the same elements and characteristics of dehydrator and desalter wash water treatment control system 500 and multi-level desalter wash water treatment system 600. Dehydrator 420 generates dehydrator wash water stream 423, which can be disposed, treatment, or recycled to another process unit. Dehydrator level control 422 monitors oil and water levels in dehydrator 420. Dehydrator 420 generates dehydrator dry crude stream 430. Dehydrator dry crude stream 430 is introduced to first desalter control valve 534, which can control the flow rate of dehydrator dry crude stream 430 to first desalter unit 538. First desalter feed stream 536 is generated from first desalter control valve 534 and is introduced to first desalter unit 538.

First desalter unit level control 540 monitors the level of oil or water in first desalter unit 538. First desalter unit 538 generates first desalter unit wash water stream 542, containing water, salt, and dissolved solids. First desalter unit wash water monitor 544 measures a variety of characteristics of first desalter unit wash water stream 542, including flow rate and TDS. First desalter unit wash water stream 542 is introduced to first desalter unit wash water control valve 546, generating first desalter unit wash water pump feed stream 548. First desalter unit wash water pump feed stream 548 is introduced to first desalter unit wash water pump 550, which can provide additional lift. First desalter unit wash water recycle stream 552 is generated from first desalter unit wash water pump 550.

First desalter unit 538 generates first desalter unit dry crude stream 554. First desalter unit dry crude monitor 556 measures a variety of characteristics of first desalter unit dry crude stream 554, including BSW, water cut, and flow rate. Recycled treated wash water stream 558 is combined with first desalter unit dry crude stream 554 generating second desalter mixed crude stream 560. A mixing valve (not shown) can be used to thoroughly blend second desalter mixed crude stream 560. Second desalter mixed crude stream 560 is introduced to second desalter control valve 562, generating second desalter feed stream 564. Second desalter feed stream 564 is introduced to second desalter unit 565. Second desalter unit level control 568 measures the level of water or oil in second desalter unit 565.

Second desalter unit 565 generates second desalter unit dry crude stream 570. Second desalter unit dry crude monitor 572 measures a variety of characteristics of desalter unit dry crude stream 570, including BSW. Second desalter unit 565 generates second desalter unit wash water stream 574. Second desalter unit wash water monitor 576 measures a variety of characteristics of second desalter unit wash water stream 574, including flow rate and TDS. Second desalter unit wash water stream 574 is introduced to second desalter unit wash water pump 578, generating wash water pretreatment feed stream 282.

Diluted draw stream 592 is removed from forward osmosis unit 188. Diluted draw stream 592 is introduced to diluted draw stream control valve 299, generating recycled treated wash water stream 558.

Figure 7:
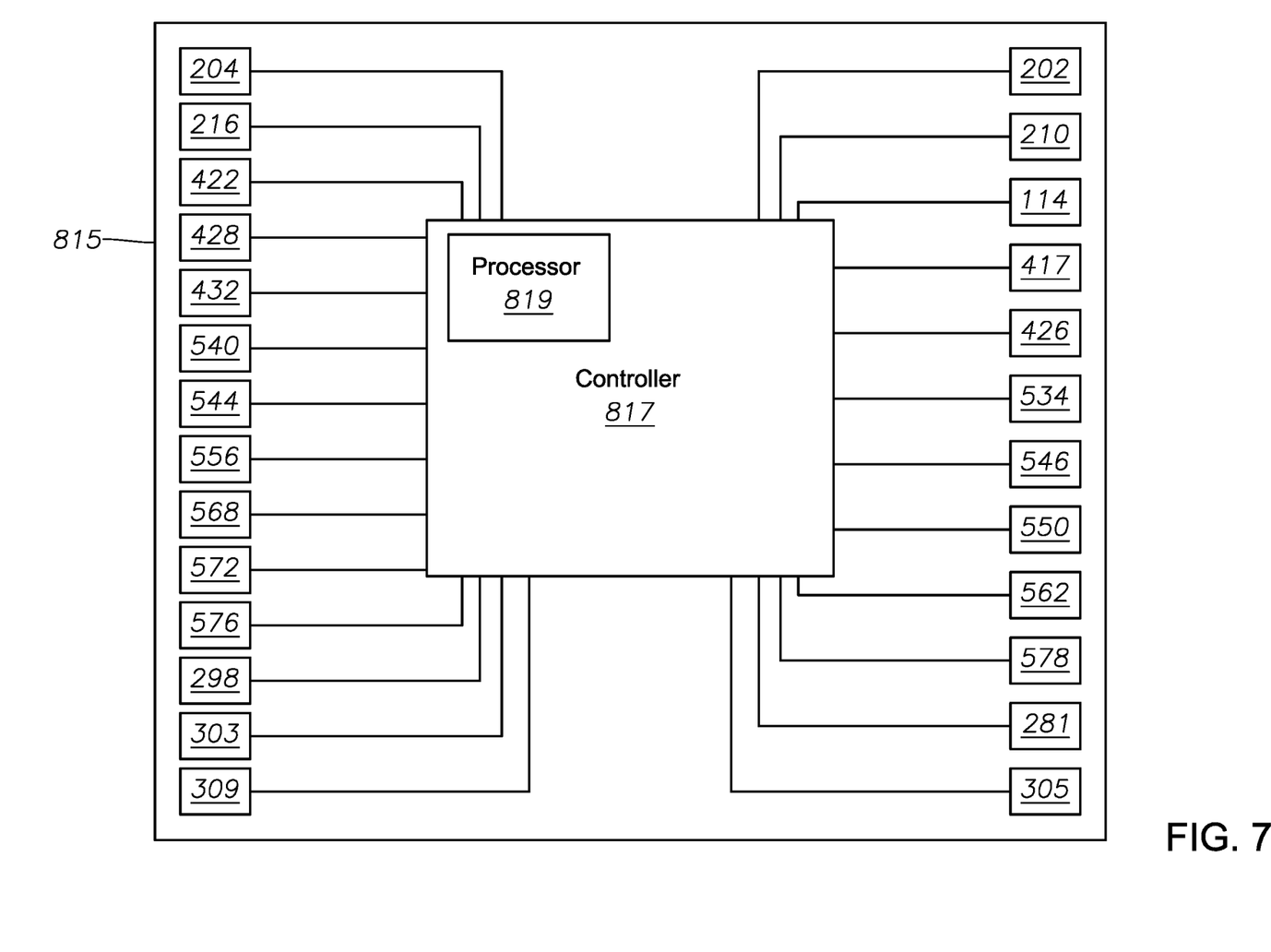
FIG. 7 is a block diagram of a control system, according to an embodiment.

Referring to FIG. 7, control system 815 is depicted. Control system 815 includes controller 817, which includes processor 819. Controller 817 receives information from a series of sensors or monitors, including inlet crude monitor 204, temperature monitor 216, dehydrator level control 422, dehydrator wash water monitor 428, dehydrator dry crude monitor 432, first desalter unit level control 540, first desalter unit wash water monitor 544, first desalter unit dry crude monitor 556, second desalter unit level control 568, second desalter unit dry crude monitor 572, second desalter unit wash water monitor 576, diluted draw stream monitor 298, concentrated wastewater monitor 303, pretreated wastewater monitor 309, and their similar related counterparts. Processor 819 processes information from monitors and from predetermined values or database information, such as by calculating the PTB value of second desalter unit dry crude stream 570 using information from second desalter unit dry crude monitor 572, second desalter unit wash water monitor 576, and Equation 1. Machine learning and artificial intelligence algorithms designed to manage operations of the desalting systems can be used to evaluate information from sensors or monitors and alter operating controls through Controller 817. The machine learning and artificial intelligence algorithms assist in predicting the next off-spec crude incident or transformer short circuit, can automatically propose setpoint changes for controllers and notify operators of inefficient operations, by monitoring salinity and water content from inlet crude monitor 204, salinity and water content from dehydrator dry crude monitor 432, salinity and water content from first desalter unit dry crude monitor 556, salinity and water content from second desalter unit dry crude monitor 572, flow rate from dehydrator wash water monitor 428, flow rate from first desalter unit wash water monitor 544, flow rate from second desalter unit wash water monitor 576, level from dehydrator level control 422, level from first desalter unit level control 540, level from second desalter unit level control 568, and electricity flow to electric coalescers. The machine learning can also be used to update and maintain the predictive computer models for the desalting and GOSP systems. Additionally, the machine learning and artificial intelligence algorithms can predict the need for cleaning or replacement of the forward osmosis filter or membrane using dehydrator wash water monitor 428, first desalter unit wash water monitor 544, second desalter unit wash water monitor 576, diluted draw stream monitor 298, concentrated wastewater monitor 303, pretreated wastewater monitor 309, the pressure drop across semipermeable membrane 190 in forward osmosis unit 188, and their similar related counterparts, including temperature, flow rates, TDS measurements, and pressure. The adjustments of the operating parameters is based on a predictive model derived using characteristics monitored over a period of time. A predictive model is created through experiment or through artificial intelligence based on the historical data, which correlates values such as salt-in-crude and BSW measurements with the operations variables.

Controller 817 sends signals based upon information received and calculated from the series of sensors or monitors to a series of operating controls, including an amount of demulsifier 202, pump 210, heater 114, dehydrator control valve 417, dehydrator wash water control valve 426, first desalter control valve 534, first desalter unit wash water control valve 546, first desalter unit wash water pump 550, second desalter control valve 562, second desalter unit wash water pump 578, wasted wash water stream control valve 281, wastewater feed stream control valve 305, and their similar related counterparts. Controller 817 can also control demulsifier concentration, dehydrator voltage, desalter voltage mixing valve pressure drops, dehydrator current, desalter current, and other factors. For example, if processor 819 identifies that the PTB value for second desalter unit dry crude stream 570 is below a predetermined value, such as 6 lb salt/1000 barrels, processor 819 can identify which of the monitors is registering above optimal levels, identifying possible control aspects that can be adjusted. Controller 817 can then signal to a variety of operating controls to adjust operation of the desalting system. For example, controller 817 may signal to increase the flow of wasted wash water stream 180 through further opening of wasted wash water control valve 281. Controller 817 may also signal to decrease the flow of wastewater feed stream 194 from wastewater feed stream control valve 305 in order to reduce the permeate flow rate in forward osmosis unit 188, thus increasing the TDS of diluted draw stream 592. Alternately, or additionally, controller 817 can signal to decrease the addition of demulsifier 202 to untreated inlet crude stream 201. As another example, in the event the salt content of a desalting unit dry crude stream is higher than 10 PTB, controller 817 will perform one or more of the following actions as processer 819 directs using machine learning and artificial intelligence algorithms: increase the amount of demulsifier 202 being introduced to untreated inlet crude stream 201; increase the electric coalescer voltage; increase the wash water rate through opening diluted draw stream control valve 299 and increasing wastewater feed stream 194 to forward osmosis unit 188 by opening wastewater feed stream control valve 305; and optimize the pressure drop across second desalter control valve 562, or across the mixing valves, to decrease the oil feed and the emulsion formation. Additionally, by monitoring the TDS levels from diluted draw stream monitor 298, controller 817 can increase the flow of wastewater feed stream 194 through altering diluted draw stream control valve 299 to maintain the TDS levels within an optimal range. In another example, if the TDS and BSW measurements from dehydrator dry crude monitor 432 show high levels in comparison to a predetermined value loaded into or calculated by processor 819, controller 817 can direct first desalter unit was water recycle stream 552 to be increased by opening first desalter unit wash water control valve 546. In another example, if the TDS and BSW measurements from first desalter unit dry crude monitor 556 show low levels in comparison to a predetermined value loaded into or calculated by processor 819, controller 817 can direct first desalter unit was water recycle stream 552 to be decreased by closing first desalter unit wash water control valve 546.

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

As used in the specification and in the appended claims, the words "comprise," "contains," "has," and "include" and all grammatical variations thereof are each intended to have an open, non-limiting meaning that does not exclude additional elements or steps.

As used throughout the specification and claims, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

What is claimed is:

1. A method of simultaneously treating multiple industrial water streams, the industrial water streams including a wash water stream and a wastewater feed stream, the method comprising the steps of:
   removing the wash water stream from a desalting unit, the wash water stream comprising water and dissolved solids;
   dividing a portion of the wash water stream generating a wasted wash water stream and a forward osmosis draw stream having a draw stream osmotic pressure;
   introducing the forward osmosis draw stream to a draw side of a forward osmosis unit comprising a semipermeable membrane, the forward osmosis unit operable to selectively allow water transport through the semipermeable membrane while restricting dissolved solids from passing through the semipermeable membrane;
   introducing the wastewater feed stream having a feed stream osmotic pressure to a feed side of the forward osmosis unit, the feed stream osmotic pressure being lower than the draw stream osmotic pressure;
   allowing water to permeate through the semipermeable membrane from the feed side into the draw side;
   generating a diluted draw stream from the draw side of the forward osmosis unit, the diluted draw stream having more water than the forward osmosis draw stream; and
   generating a concentrated wastewater stream from the feed side of the forward osmosis unit, the concentrated wastewater stream having less water than the wastewater feed stream.

2. The method of claim 1, wherein the diluted draw stream is recycled to the desalting unit, such that the diluted draw stream is mixed with an inlet crude stream to generate a desalting unit feed stream.

3. The method of claim 2, wherein the wastewater feed stream and the wash water stream are chemically untreated prior to contact with the semipermeable membrane, and further wherein the wash water stream is chemically untreated prior to recycling to the desalting unit.

4. The method of claim 2, wherein the osmotic pressure of the wastewater feed stream and the wash water stream are not altered outside of the forward osmosis unit.

5. The method of claim 2, wherein no additional removal of components from the diluted draw stream is performed prior to recycling the diluted draw stream to the inlet crude stream.

6. The method of claim 2, further comprising the steps of:
   generating a dehydrator wash water stream comprising water and dissolved solids from a dehydrator; and
   introducing the dehydrator wash water stream to the draw side of the forward osmosis unit.

7. The method of claim 2, wherein the diluted draw stream has a diluted draw stream dissolved solids content of less than 12,000 ppm.

8. The method of claim 1, further comprising the steps of:
   removing a dry crude stream from the desalting unit;
   recording a dry crude basic sediment and water measurement from a dry crude monitor operable to measure characteristics of the dry crude stream;
   recording a wash water dissolved solids measurement from a wash water monitor operable to measure characteristics of the wash water stream; and
   calculating a PTB value for the dry crude stream using the formula:

$$PTB = 0.35 * CF * \frac{BSW}{100 - BSW} * TDS * \left[1 + 0.695 * TDS * 10^{-6}\right]$$

wherein PTB is the PTB value in pounds of salt per one thousand barrels of the dry crude stream; BSW is the dry crude basic sediment and water measurement of the dry crude stream in volume percent; TDS is the wash water dissolved solids measurement in mg/L of the wash water stream; and CF is a correction factor to account for the overall system mixing inefficiency in mixing valves, vessels, and an existence of solid salt crystals in the crude.

9. The method of claim 8, wherein CF is 1.

10. The method of claim 8, further comprising the step of controlling operation of the desalting unit based upon the PTB value and a predetermined PTB value by adjusting a wastewater feed stream flow rate for the wastewater feed stream such that wash water generation is reduced in comparison to a volume of wash water generated from controlling the operation of the desalting unit without the calculation.

11. The method of claim 10, wherein the predetermined PTB value is 10 lb of salt per 1000 barrels of dry crude.

12. A system for simultaneously treating multiple industrial water streams, the industrial water streams including a desalting unit wash water stream and a wastewater feed stream, the system comprising:
   a desalting unit operable to remove salt from a desalting unit feed stream, wherein the desalting unit generates a dry crude stream comprising crude oil and the desalting unit wash water stream comprising water and dissolved solids and having a draw stream osmotic pressure; and
   a forward osmosis unit fluidly connected to the desalting unit, the forward osmosis unit comprising a semipermeable membrane separating a draw side and a feed side;
      wherein the forward osmosis unit is configured to accept the wastewater feed stream having a feed stream osmotic pressure to the feed side of the forward osmosis unit;
      wherein the forward osmosis unit is configured to accept the desalting unit wash water stream to the draw side of the forward osmosis unit, the feed stream osmotic pressure being lower than the draw stream osmotic pressure;
      wherein the forward osmosis unit is operable to selectively allow water transport from the feed side to the draw side through the semipermeable membrane while restricting dissolved solids from passing through the semipermeable membrane, such that the forward osmosis unit generates a diluted draw stream from the draw side of the forward osmosis unit having more water than the desalting unit wash water stream, and further such that the forward osmosis unit generates a concentrated wastewater stream from the feed side of the forward osmosis unit having less water and a reduced volume as compared to the wastewater feed stream.

13. The system of claim 12, further comprising:
   a wash water pretreatment unit, operable to filter the desalting unit wash water stream before entry to the draw side of the forward osmosis unit, wherein the wash water pretreatment unit operates in an absence of chemical treatment; and
   a wastewater pretreatment unit, operable to filter the wastewater feed stream before entry to the feed side of the forward osmosis unit, wherein the wastewater pretreatment unit operates in an absence of chemical treatment.

14. The system of claim 12, further comprising:
   a dehydrator operable to separate oil from water and generate a dehydrator dry crude stream and a dehydrator wash water stream, the dehydrator fluidly connected to the desalting unit, wherein the diluted draw stream is introduced to the dehydrator dry crude stream generating the desalting unit feed stream.

15. The system of claim 12, further comprising a heater operable to increase a mixed crude stream temperature, generating the desalting unit feed stream.

16. A method for controlling the operation of a desalting unit, the method comprising the steps of:
   generating a desalting unit dry crude stream from the desalting unit;
   generating a desalting unit wash water stream from the desalting unit;
   treating the desalting unit wash water stream in a forward osmosis unit, the forward osmosis unit operable to selectively allow water transport through a semipermeable membrane while restricting dissolved solids transport, such that the forward osmosis unit generates a diluted draw stream;
   simultaneously treating a wastewater feed stream in the forward osmosis unit, such that the forward osmosis unit generates a concentrated wastewater stream;
   measuring a dry crude basic sediment and water measurement from a desalting unit dry crude monitor operable to measure characteristics of the desalting unit dry crude stream;
   measuring a desalting unit wash water dissolved solids measurement from a wash water monitor operable to measure characteristics of the desalting unit wash water stream;
   sending the dry crude basic sediment and water measurement and the desalting unit wash water dissolved solids measurement to a controller, the controller comprising a processor operable to process monitor data, the controller operable to control one or more system operations control;
   calculating a PTB value for the desalting unit dry crude stream through the processor using the formula:

$$PTB = 0.35 * CF * \frac{BSW}{100 - BSW} * TDS * [1 + 0.695 * TDS * 10^{-6}]$$

wherein PTB is the PTB value in pounds of salt per one thousand barrels of the desalting unit dry crude stream; BSW is the dry crude basic sediment and water measurement of the desalting unit dry crude stream in volume percent; TDS is the desalting unit wash water dissolved solids measurement in mg/L of the desalting unit wash water stream; and CF is a correction factor to account for the overall system mixing inefficiency in mixing valves, vessels, and an existence of solid salt crystals in the crude;
   comparing the PTB value to a predetermined PTB value programmed within the controller; and
   adjusting one or more system operations control through the controller such that the PTB value nears without meeting the predetermined PTB value.

17. The method of claim 16, wherein CF is 1.

18. The method of claim 16, further comprising the steps of:
   sending one or more operations monitor measurement to the controller; and
   adjusting one or more system operations control through the controller based upon the one or more operations monitor measurement.

19. The method of claim 18, wherein the one or more system operations control comprises a wastewater feed stream control valve operable to vary a wastewater feed stream flow rate of the wastewater feed stream.

20. The method of claim 18, further comprising the step of recycling the diluted draw stream to the desalting unit, wherein the one or more system operations control comprises a diluted draw stream control valve operable to vary a diluted draw stream flow rate.

21. The method of claim 18, wherein the one or more operations monitor measurement is selected from the group consisting of: a diluted draw stream flow rate, an inlet crude dissolved solids measurement, a desalting unit feed stream temperature, a desalting unit level measurement, a desalting unit wash water flow rate, a wastewater feed stream dissolved solids measurement, a concentrated wastewater stream dissolved solids measurement, and combinations of the same.

22. The method of claim 21, wherein:
an artificial intelligence algorithm predicts when the PTB value for the desalting unit dry crude stream will exceed the predetermined PTB value based upon the one or more operations monitor measurements; and
the artificial intelligence algorithm provides changes to the one or more system operations control.

23. The method of claim 18, wherein the one or more system operations control is selected from the group consisting of: a heater, a desalting unit control valve, a desalting unit wash water pump, a wasted wash water control valve, a desalting unit current, a demulsifier injection rate, and combinations of the same.

\* \* \* \* \*